July 16, 1929.  J. B. GALBRAITH  1,720,829
CHUCK FOR LATHES AND PIPE WORKING MACHINES
Filed June 17, 1925

Inventor
Joseph B Galbraith
By  J M Thomas
his Attorney

Patented July 16, 1929.

1,720,829

UNITED STATES PATENT OFFICE.

JOSEPH B. GALBRAITH, OF KAYSVILLE, UTAH.

CHUCK FOR LATHES AND PIPE-WORKING MACHINES.

Application filed June 17, 1925. Serial No. 37,685.

My invention relates to chucks for use on lathes and pipe working machines, and has for its object to provide a new, useful, and quick means for tightening and loosening the jaws of the chuck on a piece of material, which is being put into the chuck or removed therefrom.

A further object is to provide a chuck which will tighten on or release from a piece of material by the power of the lathe or machine on which it is used.

These objects I accomplish with the device illustrated in the accompanying drawings in which similar letters and numerals of reference indicate like parts throughout the several views and as described in the specification forming a part of this application and pointed out in the appended claim.

Figure 1:
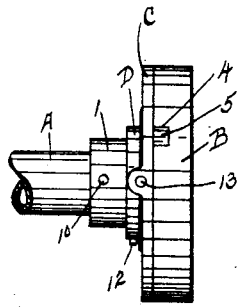
Figure 2:
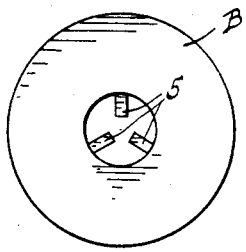
Figure 3:
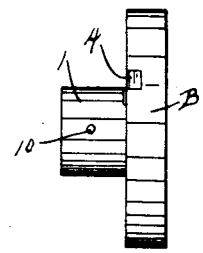
Figure 4:
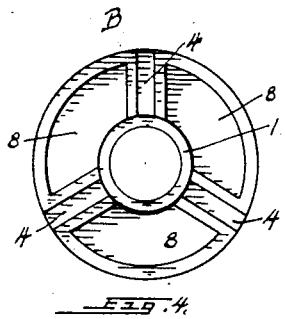
Figure 5:
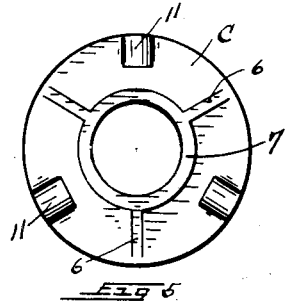
Figure 6:
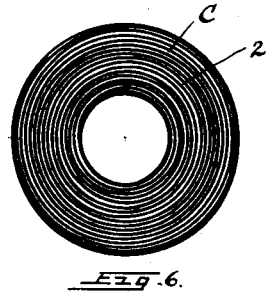
Figure 7:
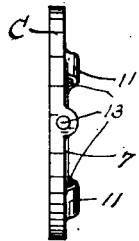
Figure 8:
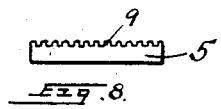

In the drawings in which I have shown the best and most substantial embodiment of my invention, Figure 1 is a side elevation of my chuck secured on a section of tube. Figure 2 is a front end elevation of my chuck. Figure 3 is a side elevation of the body of the chuck. Figure 4 is a rear end elevation of the same. Figure 5 is a front view of the front end of the scroll plate. Figure 6 is an elevation of the rear end of the same, showing the scroll threads thereon. Figure 7 is an edge elevation of the same. Figure 8 is a side elevation of one of the jaws.

The invention consists of the new and special construction, arrangement, and operation of the various parts of the chuck which is light in weight, made of few parts, economical in construction, compact in form, and has a range of adjustment which will hold in one sized machine any object which may be gripped by the inner points of the jaws, and from said sized object it will grip and hold up to as large an object as may be inserted through the body plate, and which range of adjustment may be made and quickly covered by the power applied through the machine.

In the drawings I have shown a section of a tube A used in pipe working machines on which the body of my chuck is secured by the set screws 10 passed through the wall of a sleeve flange 1, integral with the body plate B. A plate C is carried on the said sleeve flange 1, and on its rear face a scroll thread 2, having many convolutions, is cut. The said plate C is held against the body plate B by the collar D. The front face of said plate C has a flange 7 which bears against said collar D and integral therewith are the radially disposed ribs 6 for giving the greatest strength with the minimum amount of material in said plate. Spaced between said ribs 6 are the radially bored bosses 11, which bosses are to be engaged by a hand tool or bar by which said plate C is held from rotation when the body plate B is rotated for adjusting the gripping jaws. On the back face of the said body plate B, three radially disposed channels or recesses 4 are cut for carrying the jaws 5, which jaws are operated therein by the scroll thread 2 which is cut in the contiguous face of said plate C. The said channels are open at both ends and the jaws are longer than usual in order that either end may be extended while the engagement of the scroll threads holds the jaw. Segments 8 are cut out of the same side of the said body plate B as the grooves 4 in order to make the machine lighter. The said jaws 5 are shaped to conform with and are operated longitudinally in said channels 4 and with one face transversely cut with teeth 9 in the shape of a rack for engagement and meshing with the scroll thread 2 of the plate C. The said collar D is held in place by the set screws 12. As will be obvious the body of the chuck may be fastened on and used with the rotating spindle of a lathe.

The operation of my device is as follows:—

With a piece of pipe or other material to be secured in the chuck which is used on a lathe or pipe machine, said piece is slipped into the space at the inner ends of jaws 5 and the spindle or tube A is rotated. A hand tool or other short bar is inserted in the bore 13 of one of said bosses 11 on the scroll plate C. The said hand tool or bar (not shown) with one end in the hole 13 bears on the tool rest of the lathe and holds the plate C from turning. The other parts of the chuck are then rotated and the action of the scroll thread 2, as engaged with the teeth 9 of the jaws 5, will move said jaws 5 inwardly until the material to be centered and held will be gripped by the said jaws. The hand tool or bar is then removed from the hole 13 and the material is ready to be worked upon in the lathe or pipe threading machine. To remove this work from the chuck the rotation is reversed and the hand tool or bar is inserted in the hole 13 until the action of the scroll thread moves the jaws outwardly and the material is released.

Having thus described my invention I desire to secure by Letters Patent and claim:—

A chuck comprising a tube adapted for rotation in either direction; a body plate having a central bore therethrough; a sleeve flange formed on said body plate; means to secure said flange to said tube; an annular flange on the outer perimeter of said plate; radially disposed channels formed on the rear face of said plate with the side walls thereof connecting the sleeve flange with the annular flange; gripping jaws having the same shape as the channels and slidably carried therein; transversely disposed teeth cut in one side face of said jaws; a plate having a scroll thread cut in one face thereof with a flange formed on the other face, said scroll threads adapted to engage with the teeth of said jaws to move them when the plate is rotated; bosses formed radially on the back side of said plate having longitudinal holes therein in which a bar may be placed to hold said plate from rotating when the body is rotated; and a collar adapted to be carried around said sleeve flange to hold said scroll plate adjacent said body plate, substantially as described.

In testimony whereof I have affixed my signature.

JOSEPH B. GALBRAITH.